United States Patent [19]

Madou et al.

[11] Patent Number: 5,151,224
[45] Date of Patent: Sep. 29, 1992

[54] TETRASULFONATED METAL PHTHALOCYANINE DOPED ELECTRICALLY CONDUCTING ELECTROCHROMIC POLY(DITHIOPHENE) POLYMERS

[75] Inventors: Marc J. Madou, Palo Alto; Subhash C. Narang, Redwood City; Takaaki Otagawa, Fremont; Sharon Wing, Cupertino, all of Calif.

[73] Assignee: Osaka Gas Company, Ltd., Osaka, Japan

[21] Appl. No.: 190,540

[22] Filed: May 5, 1988

[51] Int. Cl.$^5$ .............. G02B 5/23; C08K 5/09; C08G 75/00
[52] U.S. Cl. .............. 252/586; 252/583; 524/298; 524/399; 524/413; 528/378; 528/380
[58] Field of Search .............. 528/378, 280, 379; 252/583, 586; 350/355, 357

[56] References Cited

U.S. PATENT DOCUMENTS

| | | | |
|---|---|---|---|
| 2,552,796 | 5/1951 | Koft | 266/42 |
| 4,547,439 | 10/1985 | Genies | 429/105 |
| 4,557,807 | 12/1985 | Preston et al. | 204/4 |
| 4,560,534 | 12/1985 | King et al. | 422/68 |
| 4,571,029 | 2/1986 | Skotheim et al. | 350/357 |
| 4,640,748 | 2/1987 | Wudl et al. | 204/59 R |
| 4,657,985 | 4/1987 | Droy et al. | 525/390 |
| 4,724,062 | 2/1988 | Naarmann et al. | 204/58.5 |
| 4,731,311 | 3/1988 | Suzuki et al. | 429/213 |
| 4,772,940 | 9/1988 | Wudl et al. | 358/59 |
| 4,795,242 | 1/1989 | Wudl et al. | 350/357 |
| 4,795,687 | 1/1989 | Suzuki et al. | 429/213 |
| 4,973,391 | 11/1990 | Madou et al. | 204/78 |

FOREIGN PATENT DOCUMENTS 0217099 4/1987 European Pat. Off. .
60-188931 9/1985 Japan .
85/05728 12/1985 World Int. Prop. O. .

OTHER PUBLICATIONS

Droy, M. A. J. Physique Colloque vol. C-3, 595, 1983.
Garvier, F. et al. J. Electroanal. Chem. 148, 299 1983.
K. Kaneto et al., Japanese Journal of Applied Physics, vol. 22, No. 7, pp. L412-L414, published 1983.
K. Kaneto et al, Japanese Journal of Applied Physics, vol. 25, No. 7, Jul. 1985, pp. L553-L553.
J. Castonguay et al. in Thin Solid Films, vol. 69, pp. 85-97 (1980).
T. Osaka et al., Bulletin of the Chemical Society of Japan, vol. 59, pp. 2717-2722 (1986).
T. Inabe, et al., Polymer Materials Science Engineering, vol. 49, pp. 89-93 (1983).
T. Skotheim et al., Journal of Chemical Society, Chemical Communications, pp. 612-613 (1985).
T. Inabe et al., Synthetic Metals, vol. 9, pp. 303-316 (1984).

Primary Examiner—Robert L. Stoll
Assistant Examiner—Shean C. Wu
Attorney, Agent, or Firm—Phillips Moore Lempio & Finley

[57] ABSTRACT

The present invention relates to a process of manufacture of an essentially smooth texture-free conductive polymer comprising poly(dithiophene) which is subsequently doped with a dopant comprising an organometallic compound, preferably an optionally substituted metal phthalocyanine. Specifically, the process relates to a process to produce a smooth, texture-free conductive polymer comprising poly(dithiophene) and an organometallic compound which process comprises:

A. contacting a solution itself comprising:
(a) dithiophene is present in between about 0.01 and 0.001 M concentration;
(b) a water-soluble salt of an optionally substituted organometallic wherein the metal is selected from iron, copper, cobalt or nickel, at a concentration of between about 0.01 and 10 mM;
(c) in a solution of acetonitrile/water in a ratio of between about 30:70 and 10:90 percent by volume with a cycling potential of between about 0.1 volts and 10 volts at between about 0° and 95° C. for between about (0.1 and 60 minutes) with an electrode selected from one of a second metal, wherein the second metal is selected from platinum, palladium, indium, gold or mixtures thereof or from an indium-tin oxide covered glass; and
B. recovering the electrically conductive polymer.

The materials are useful in the manufacture of electrochromic displays.

6 Claims, 8 Drawing Sheets

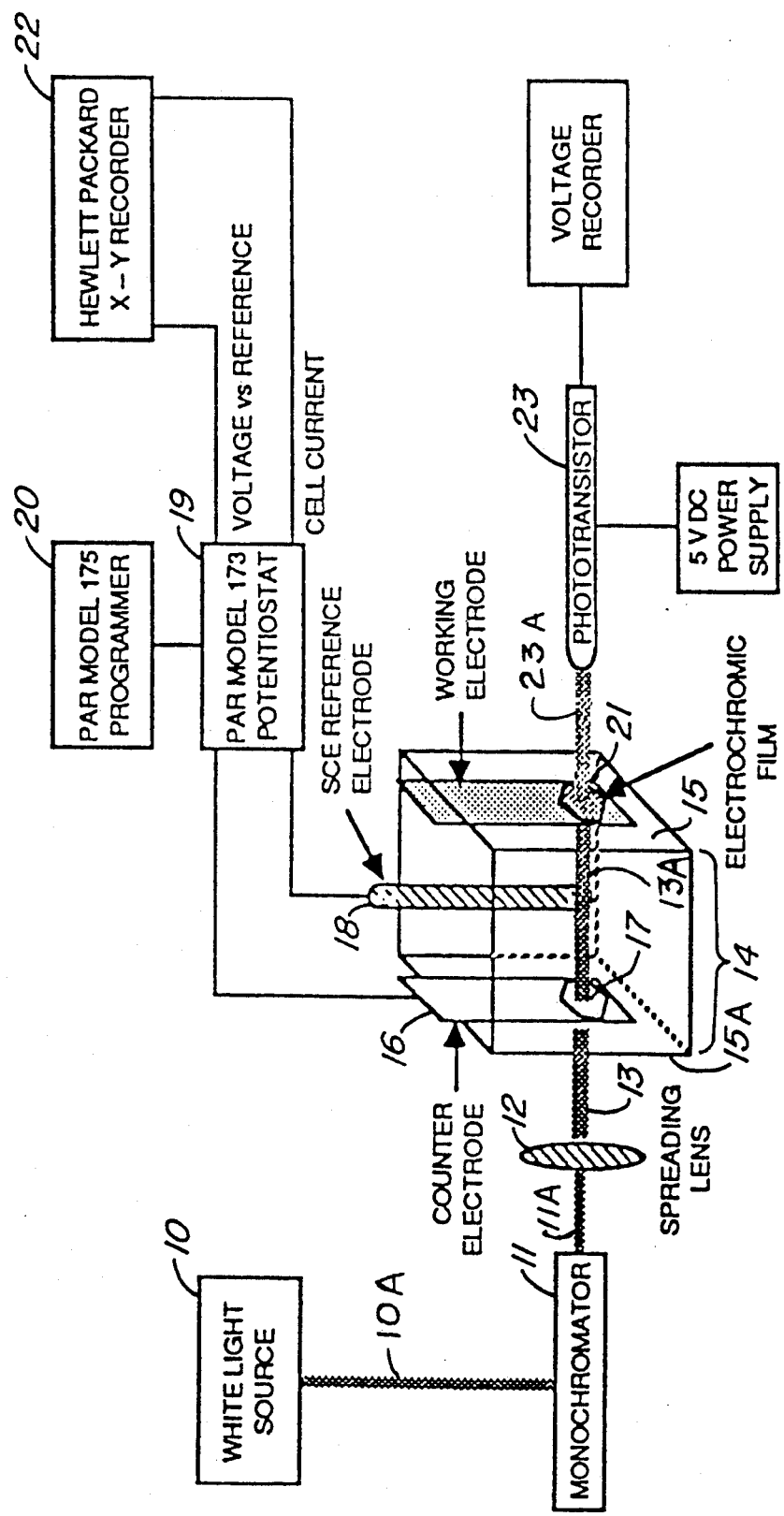
FIG._1.

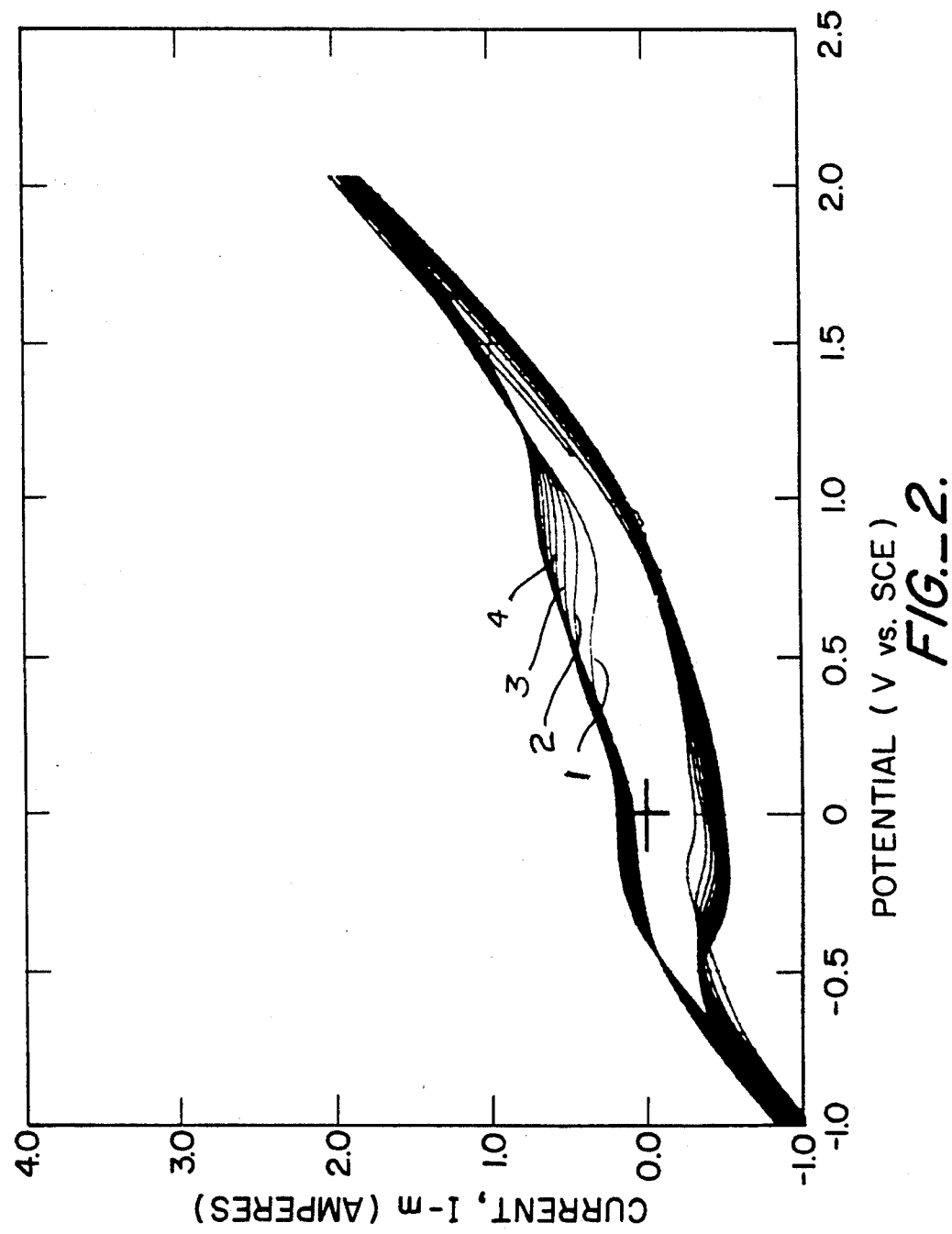
FIG._2.

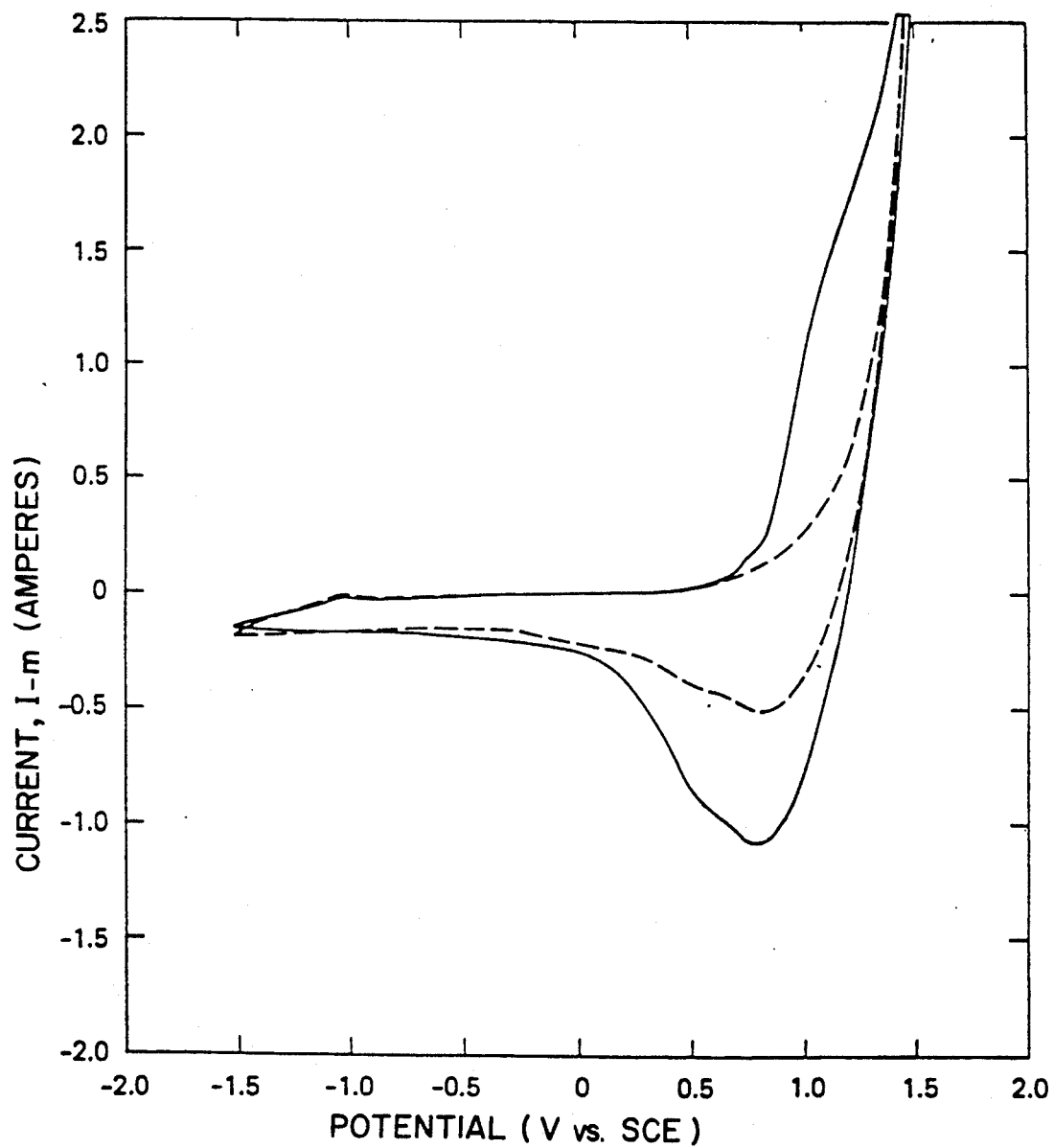
FIG._3.

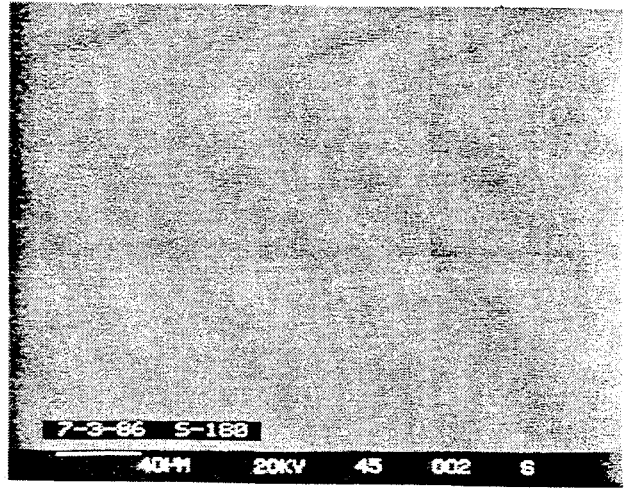
FIG._4A.
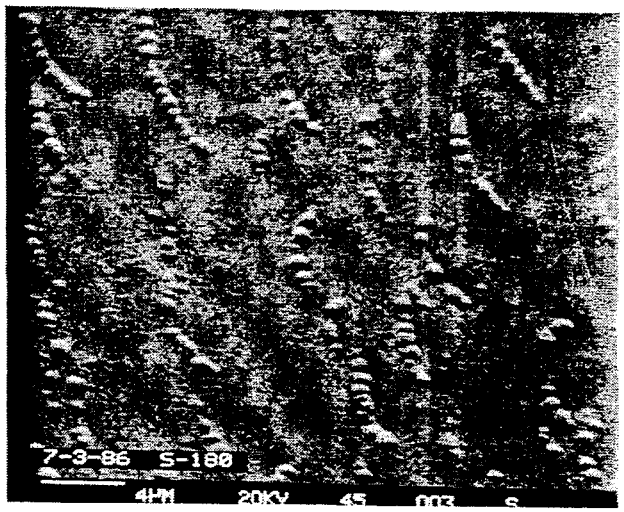
FIG._4B.

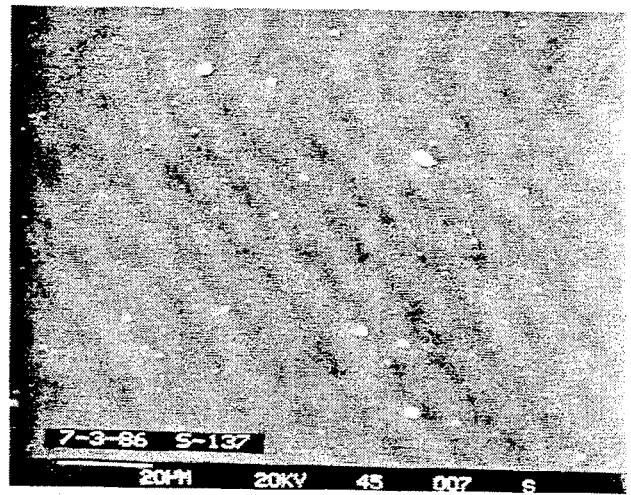
FIG._4C.
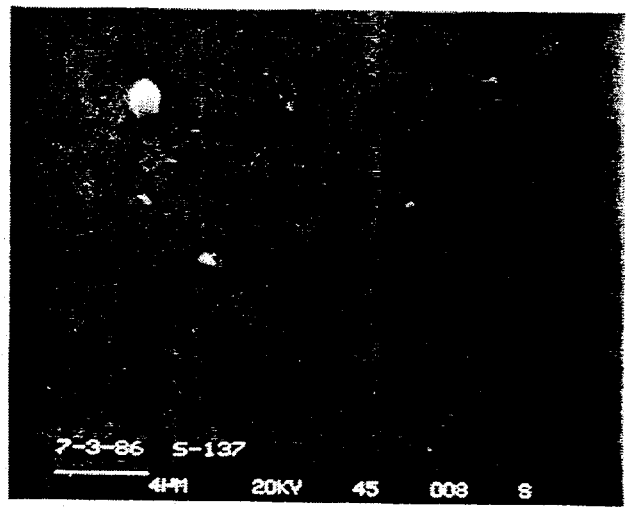
FIG._4D.

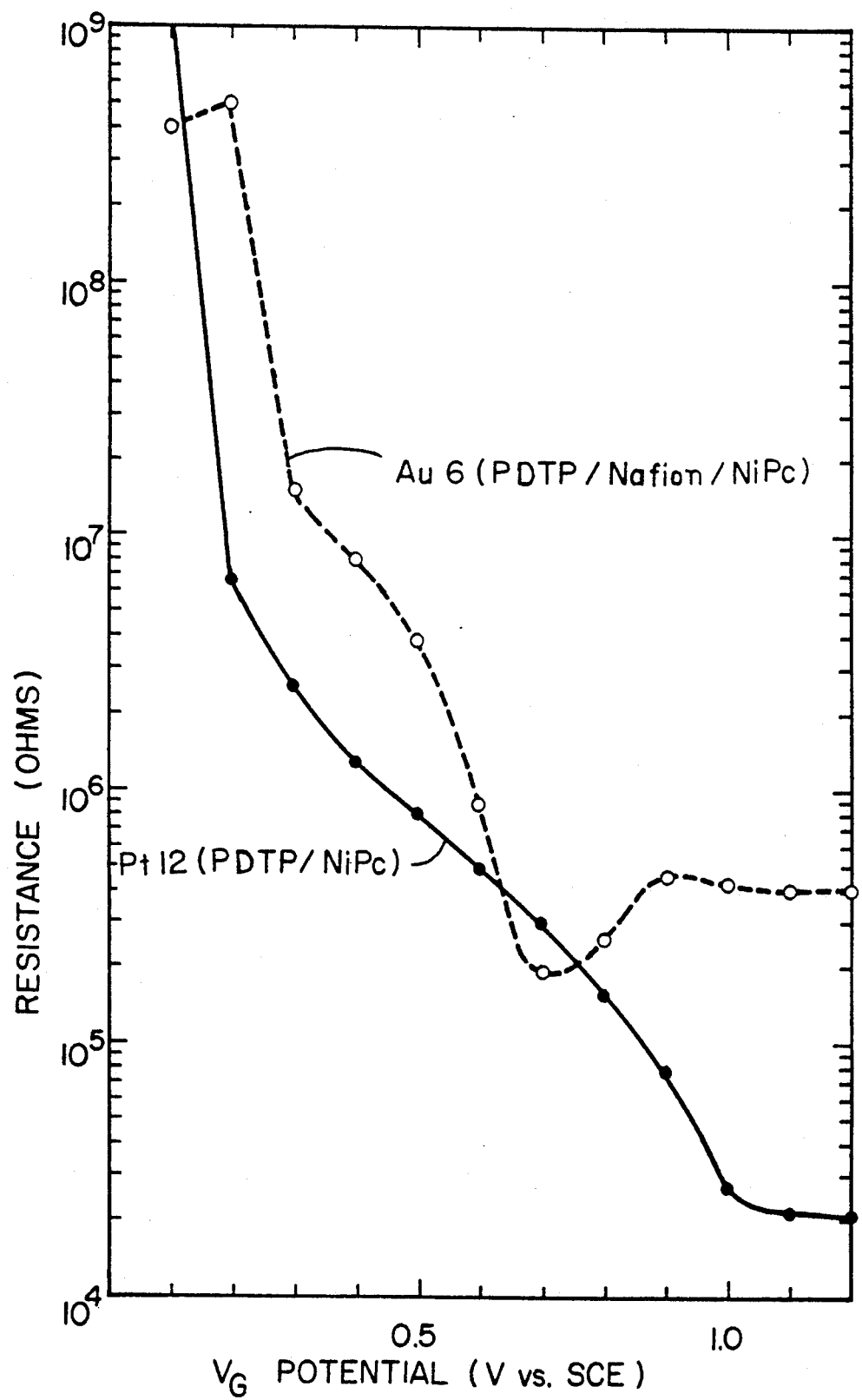
FIG._5.

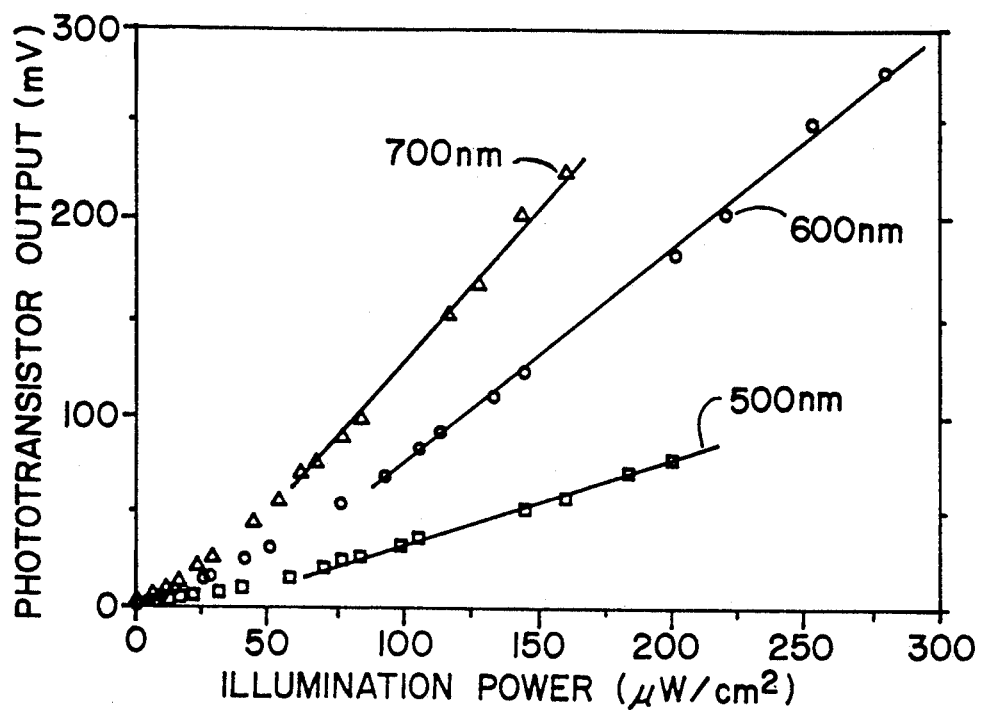
FIG._6A.
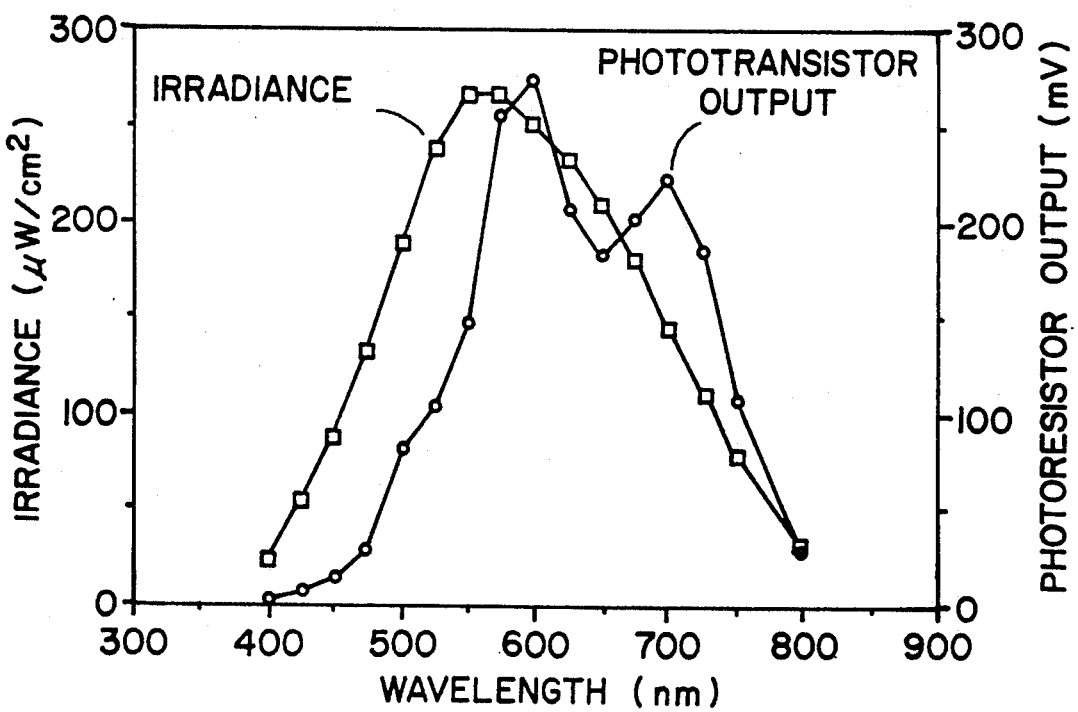
FIG._6B.

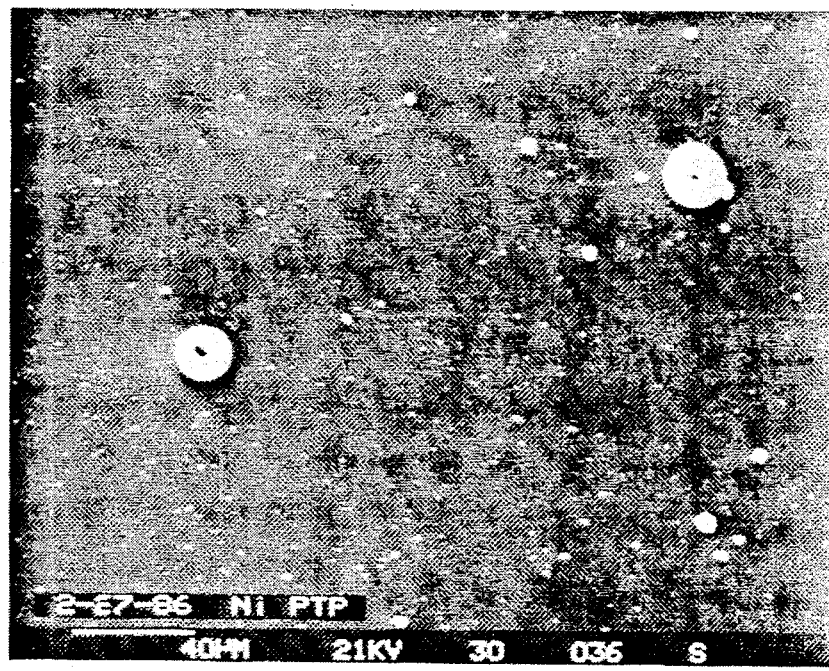
FIG._7A.
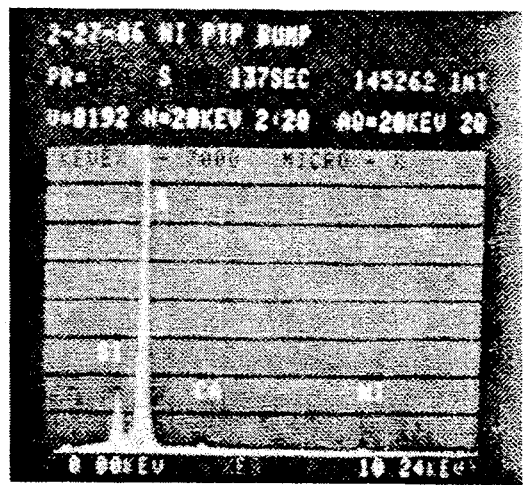
FIG._7B.

TETRASULFONATED METAL PHTHALOCYANINE DOPED ELECTRICALLY CONDUCTING ELECTROCHROMIC POLY(DITHIOPHENE) POLYMERS

BACKGROUND OF THE INVENTION

1. Field of the Invention

The present invention relates to a process to produce an electrically conductive polymer comprising poly(dithiophene) (PDTP), electropolymerizing α,α-thiophene dimer, in the presence of an organometallic compound, such as a metal phthalocyanine, as a dopant.

2. Description of the Art

A number of references disclose some heteroatom polymers which have electrochemical properties both in the presence and absence of charged dopants. These include for example the following:

A. Ootani et al., in Japanese Patent No. S60-188931, disclose an electrochromic display element synthesized by an electrochemical polymerization of a solution of pyrrole or thiophene and sodium bathophenoanthroline - sulfonate-iron complex or phthalocyanine.

K Kaneto et al., in the *Japanese Journal of Applied Physics*, Vol. 22, No. 7, pp. L412–L414 (1983) disclose some characteristics of electro-optic devices using conducting polymers polythiophene and polypyrrole films.

K Kaneto et al., in the *Japanese Journal of Applied Physics*, Vol. 25, No. 7, July 1985, pp. L553–L555 disclose a heterojunction consisting of conducting polymers of polythiophene.

J. Castonguay et al., in *Thin Solid Films*, Vol. 69, pp. 85–97 (1980) disclose the deposition of thin polymeric films using monomer molecules which have semiconductor properties. Those monomers selected were phthalocyanine, copper phthalocyanine, tetracyanodimethane (TCNQ) and its triethylamine salt and the perylene-iodine complex. The monomer having a minimal residence time of about 10 sec. in a glow discharge were minimally fragmented.

T. Osaka et al., in the *Bulletin of the Chemical Society of Japan*, Vol 59, pp. 2717-2722 (1986) disclose electrode of glassy carbon/polypyrrole/(tetrasulfonatophthalocyaninato) cobalt.

T. Inabe, et al., in *Polymer Materials Science Engineering*, Vol. 49, pp. 89–93 (1983) disclose electroconducting polymers of polyamides (aramides) and metal phthalocyanines.

T. Skotheim et al., in the *Journal of the Chemical Society, Chemical Communications*, pp. 612–613 (1985) disclose the formation of conductive polymers of polypyrrolesulfonated cobalt phthalocyanine. These electrodes are stable on repeated recycling between −1.0 and 1.2 V in acetonitrile/tetraethylammonium tetrafluoroborate, and lose only 35% of the cobaltphthalocyanine in aqueous electrolytes. The conductivity of the films increases on storing in air, in contrast to normal films containing $BF_4-$ +counterions which show a decrease in conductivity.

T. Inabe et al., in *Synthetic Metals*, Vol. 9 pp. 303–316 91984 (1984) disclose the preparation of environmentally stable, flexible, oriented electrically conductive fibers. Solutions of phthalocyanine containing macromolecular, $[Si(Pc)O]_n$, or molecular, NiPc, a metal precursor and a host polymer, "KEVLAR ®", a trademark of the DuPont Company of Wilmington, Delaware for an aromatic polyamide fiber of extremely high tensile strength are wet spun to yield, after halogen or electrochemical doping, strong, air-stable fibers with thermally activated electronic conductivities as high as $5\frac{1}{4}^{-1}cm^{-1}$.

None of the above references individually or collectively disclose or suggest the present invention of simultaneously producing a metal phthalocyanine doped conducting polymer of poly(dithiophene). The present invention is very useful to provide an electrically conductive polymer based on dithiophene having a metal phthalocyanine as a dopant.

SUMMARY OF THE INVENTION

The present invention relates to an essentially smooth, texture-free electrically conductive polymer comprising poly(dithiophene) (PDTP) which is simultaneously doped with a conductive dopant comprising an organometallic compound, such as a metal tetrasubstituted phthalocyanine.

In another aspect, the present invention relates to a process to produce a smooth, texture-free conductive polymer comprising poly(dithiophene) (PDTP) and an organometallic compound which comprises:

A. contacting a solution itself comprising:
  (a) dithiophene in between about 0.1 and 0.001M concentration;
  (b) a water-soluble salt of an optionally substituted organometallic compound having a metal selected from iron, copper, cobalt or nickel, at a concentration of between about 0.01 and 10 mM;
  (c) i n a solution of dipolar aprotic solvent/water in a ratio of between about 30:70 to 10:90 percent by volume with a cycling potential of between about 0.1 volts and 10 volts at between about 0° and 95° C. for between about 0.1 and 60 min. with an electrode selected from one of a second metal, wherein the second metal is selected from platinum, palladium, indium, gold or mixtures thereof or from an indium-tin oxide (ITO) covered glass; and B. recovering the conductive polymer.

The present invention also relates to the conductive poly(dithiophene) polymer produced by the process described herein.

In an additional aspect, the present invention relates to the electrically conductive poly(dithiophene) having a dopant comprising an optionally substituted metal phthalocyanine.

In an additional aspect, the present invention relates to the use of the polymers comprising poly(dithiophene) and a dopant comprising an optionally substituted metal phthalocyanine as a conductive polymer in an electrochromic display.

BRIEF DESCRIPTION OF THE FIGURES

FIG. 1 shows a schematic diagram of the electrochromic measuring system.

FIG. 2 shows a typical continuous cyclic voltammogram set on an indium tin oxide (ITO) covered glass electrode.

FIG. 3 shows a continuous cyclic voltammogram on a Pt electrode covered with a PTP-NiPc film in a solution of a 0.1M $LiClO_4$ in acetonitrile.

FIG. 4 shows four photographs of a mechanically very strong film which FIG. 4A has a very smooth texture-free surface within a ratio of between about 30/70 to 10/90 percent of acetonitrile to water by weight. FIGS. 4B–4D are outside the ranges of the present invention FIG. 4A and 4B are to PDTP with NiPc and FIG. 4C and 4D are to PDTP with NiPc/-ClO₄³¹.

FIG. 5 shows the resistance of NiPc-doped poly(dithiophene) as a function of the applied potential.

FIG. 6(a) shows the phototransistor calibration of amplitude response to various wavelenths.

FIG. 6(b) shows the light source spectrum and the corresponding phototransistor response.

FIG. 7(a) is a photograph of a scanning electron microscope (SEM) measurement of the deposited PDTP-nickel phthalocyanine film on a platinum electrode deposited on a glass slide.

FIG. 7(b) shows an energy dispersion x-ray analysis of the film of FIG. 7(a) examining the nonuniform areas of the film.

DETAILED DESCRIPTION OF THE INVENTION AND PREFERRED EMBODIMENTS

As used herein:

"Dithiophene" refers to the organic compound having the structure:

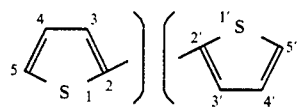

connected by carbon-carbon bonds at the 2 or 3 or 2' or 3' carbon atoms.

In another nomenclature system, position $2=\alpha$, $3=\beta$, $4=\beta$, $5=\alpha$, etc.

"Organometallic compound" refers to organometallic complexes, metal sandwich compounds, metal porphyrins, metal phthalocyanines and the like. Metal phthalocyanines are preferred.

"Poly(dithiophene)" refers to the polymer formed by electrochemically polymerizing dithiophene in solution. This polymer is more ordered and probably has the repeating structure shown:

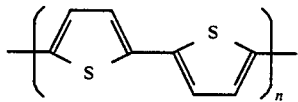

"Poly(thiophene)" refers to the polymer formed by electrochemically polymerizing thiophene in solution. This polymer has less order and may have the following repeating structures shown:

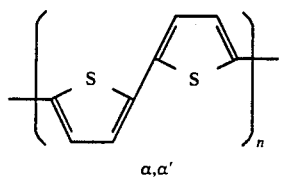
α,α'

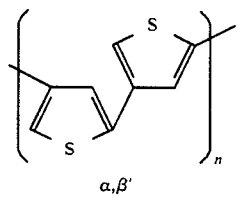
α,β'

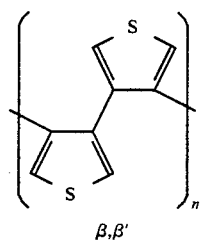
β,β'

When the linkages other than 2,2- or α,α'- dithiophene are introduced in a polymer, the conductivity decreases. If the starting monomber is α,α', then statistically fewer α,β' linkages are expected and the conductivity of the α,α' poly(dithiophene) is higher.

"Thiophene" refers to the organic compound having the structure:

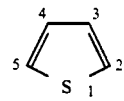

In this invention a new electronically conductive polymer of poly(dithiophene) (PDTP) doped with an organometallic compound, such as nickel phthaloyyanine (Ni-Pc), is simultaneously synthesized by electropolymerization. A cycling potential technique is used on a metal electrode, such as platinum (thin) or an indium tin oxide (ITO)-covered glass electrode using a mixed aqueous-organic solvent solution. The dithiophene present in the solution is usually between about 0.01 and 0.1 Molar (preferable between abut 0.04 and 0.07 Molar). The organometallic compound is present in between about 0.1 and 10 millimolar (preferably between about 0.5 and 5 millimolar). The organometallic may be an organic metal complex, such as nickel acetylacetone, a metal sandwich compound, such as ferrocence, a metal porphyrin, such as nickel porphyrin or metal phthalocyanine, or mixtures thereof. Preferably, the organometallic compound is a substituted organometallic having from about 1 to 6 pendant groups such as sulfo, carboxyl, and the like. The metals preferred are iron, nickel, cobalt, copper and the like. The concentration of the metal phthalocyanine is between about 0.01 and 10mM. Especially preferred is nickel, cobalt or copper tetrasulfonated phthalccyanine.

The organic solvent used is selected from dipolar aprotic solvents, such as dimethylformamide, dimethylacetamide, acetonitrile and the like. Those solvents having non-reactive nitrogen atoms present are preferred. Especially preferred is acetonitrile.

The concentration of the solvent/water in the reaction medium is between about 30/70 and 10/90 by volume. In fact, it is observed that when the ratio of acetonitrile/water changes beyond the range of 30/70 to 10/90, that a smooth conducting poly(dithiophene) is not obtained. Preferably the ratio of acetonitrile/water is about 20/80 by volume.

As is shown in the Examples, the monomer of dithiophene was selected as a starting monomer because dithiophene requires a less anodic potential (about 3.6 V versus Li) for electropolymerization by about 0.9 volt as compared to 4.5 V versus Li for the electropolymerization of the thiophene monomer. A number of attempts were made to obtain poly(thiophene) under the reaction conditions of the present invention. The results were not the smooth conductive film of the present invention.

In FIG. 2 is shown the typical continuous cyclic voltammogram set on an ITO electrode. The continuous growth with electrical cycling is evident from the increasing currents (e.g., lines 1, 2, 3, 4 . . . increasing) in both anodic and cathodic directions. When the potential is swept from $-1.5$ to $+1.5$ Volts versus the standard calomel electrode (SCE), the color of the smooth polymeric film changes from purple to green-blue to light brown, a typical electrochromic property.

The quality, resistance, and transparency of the obtained (PDTP) films appear to be critically dependent upon the ratio of solvent to water, particularly to acetonitrile and water. An optimal composition is about 20/80 by volume acetonitrile/water.

The PDTP films produced by electrochemical polymerization are very smooth (an important property) and texture free as shown in FIG. 4A Further, the film PDTP is strong mechanically.

The amount of dopant (e.g. organometallic compound) required to give the same order of conductivity (e.g. $1\Omega^{-1}cm^{-1}$) as existing PDTP films typically doped 16-25 atom percent perchlorate is only about 0.1 to 0.5 atom percent. Specifically, the nickel phthalocyanine units are believed to link to various polymer chains, which introduces a relatively high state of order in the polymer backbone.

FIG. 3 discloses a continuous voltammogram on a Pt electrode covered with a PDTP-NiPc film in a solution of 0.1M LiClO$_4$ in acetonitrile. The solid line curve describes the nth cyclic voltammogram. The dotted line curve describes the first cyclic voltammogram.

FIG. 4A shows the smooth polymer obtained by simultaneous polymerization of the dithiophene and NiPc.

An adequate level of doping was also obtained by using other metal phthalocyanines, such as CuPc and CoPc, in similar experiments. As shown in the Examples, these organometallic doped poly(dithiophene) conductive (electrochromic) polymers unexpectedly are superior in several key aspects as compared to the reported anion doped PTP (polythiophene) conductive polymers. See Table 1 below.

TABLE 1

| Comparison of Properties | |
|---|---|
| NiPc doped poly(dithiophene) smooth film | Doped poly(thiophene) film |
| Tough film | Brittle polymer |
| Smooth film | Rough surface |
| Low formation voltage | High formation voltage |
| Doping flexibility of organic solvent/water ratio | — |
| Very small amounts dopant | High amounts of dopant needed |
| Transparency easier | Dark |

TABLE 1-continued

| Comparison of Properties | |
|---|---|
| NiPc doped poly(dithiophene) smooth film | Doped poly(thiophene) film |
| to control Adhesion is very good Long term stability | Peels Only reasonably stable |

Of a number of polymers studied, PDTP, while showing a color change, charged from dark blue to dark brown as the potential changed from $+1.5$ to $-1.5$ V vs. SCE. The better response was obtained when the substrate was an ultrathin platinum coated glass. The formulation and test conditions are shown in Table 2 as part of Example 2.

Repeatable electrochromic results with the PDTP films were obtained when ultra-thin-platinum-coated glass is used as a substrate. Films of PTP with nickel phthalocyanine with or without NAFION ®, a trademark of the DuPont Company, Wilmington, Delaware, for a perfluorosulfonic acid polymer (which are studied in 1M HCl to avoid any possible dissolution of nickel-phthalocyanine (especially when acetonitrile is used as a solvent) exhibit response times in the range of 1.5 to 7 seconds with a slight intensity change (0.5 to 18 mV). NAFION ® was incorporated with PDTP to improve the electrochromic properties with ambivalent results.

Apparatus

FIG. 1 depicts schematically the experimental setup used to evaluate polymer performance. Light source 10 consists of a Kodak slide projector having a light beam 10 A focused into a Bausch and Lomb Model 33-86-02 monochromator 11 to provide near-coherent light 11A at the desired wavelength. Convex lens 12 is used to defocus the light from the monochromator to a round beam 13. Electrochemical cell 14 is constructed with optically flat glass plates 15 and 15A through which the light beam 13 is passed. Counter electrode 16 was a platinum sheet with a hole 17 which the light beam 13 can pass (as beam 13A). A saturated calomel electrode (SCE) is used as the reference electrode 18. A Princeton Applied Research (PAR) Model 173 potentiostat 19 is used in conjunction with a PAR Model 175 universal programmer 20 to control the potential of the polymer electrode 21. The response times of the electrochromic film 21 are determined using an x-t recorder 22 which has an intrinsic response time of approximately 10 milliseconds (ms).

Phototransistor Calibration

The optical transmittance of experimental polymers (i.e. the intensity of the transmitted light 23 through the conducting polymer) was measured using a Fairchild Type FPT 100 npn phototransistor 23. Light beam 23A is less intense than light beam 13A because of absorption by electrochromic film 21. The photodetector amplitude and time response were calibrated for several wavelengths of light using a Laser Precision Inc., Model RK5100 Pyroelectric Radiometer light-measuring device and a Tektronix Model 8844 dual-beam oscilloscope, respectively. FIG. 3 shows the typical amplitude and response-time of approximately 1.5 microseconds ($\mu s$) is more than adequate for the test of the polymer films, which typically have response times greater than 0.1 sec.

FIG. 6(a) shows the phototransistor calibration in terms of the amplitude response to various wavelengths. The phototransistor response was slightly nonlinear at lower irradiances (less than 70 $\mu W/cm^2$) over the visible range of light; all subsequent plots are corrected for this nonlinearity. FIG. 6(b) shows the light source power spectrum (measured by the pyroelectric radiometer) and the corresponding phototransistor response. Although the light source exhibits a bell-shaped spectrum, the phototransistor response is distorted; specifically, a valley in the phototransistor amplitude/wavelength curve at about 650 nm results from absorption of the light by the phototransistor itself. From these calibration curves, we can determine the actual light-transmitting properties of the electrochromic films.

Preparation of Electrochromic Polymer Films

The electrochromic polymers were electrochemically grown as described herein, either on indium-doped tin oxide (ITO)-coated glass plates or on a transparent, ultrathin platinum-coated microscope slide glass. The ITO-coated glass plates (purchased from Technical Glass Products specified as Corning 7740 glass with a sheet resistance of $5\Omega/cm^2$) were used after one-half hour in an ultrasonic cleaner with trichloroethylene and alcohol. Unfortunately, adhesion of PTP films on the ITO substrate was poor and did not allow the study of their electrochromic properties; The transparent, ultrathin (about 40- to 50-nm) platinum-coated microscope slide glass substrates (with which the majority of the experiments were performed) were prepared using a sputtering technique, individually tested to ensure that the light transmittance over the visible range was at least twice that of the polymers of interest, and then cleaned ultrasonically in a standard microcontamination cleaner used in the silicon industry. The sheet resistance of the thin platinum layers was approximately $100\Omega/cm^2$.

FIG. 5 shows the resistance of a NiPc-doped poly(dithiophene) (PDTP) measured between two adjacent microelectrodes as a function of the applied potential using an interdigitated microelectrode array. The NiPc-doped polydithiophene exhibits a large change in resistivity (five orders of magnitude) from an insulator to a semiconductor as the potential changes from 0 to 1.2 V vs. SCE. Because the geometry of the microelectrode/polymer assembly is not well-defined, it is difficult to assess the conductivity of the oxidized polymer. However, we estimate the conductivity of the polydithiophene-NiPc to be on the order of $2 \times 10^{-2}$ S(Siemans)/cm.

FIG. 7(a) shows a scanning electron microscope (SEM) picture of the deposited PDTP-nickel phthalocyanine film on a platinum electrode deposited on a glass slide. Although the film initially looks rather uniform, some circular objects (or particles) were detected on the polymer surface.

An energy dispersion x-ray analysis (EDAX) of the film to examine these non-uniform areas of the film is shown in FIG. 7(b). This Figure shows that non-uniform areas are composed of PDTP-NiPc, that are concentrating in certain places. Although not known with certainty, it appears that in high electric fields, imperfections in the sputtered Pt are responsible for these local PDTP-NiPc imperfections (bumps). The silicon and calcium peaks in FIG. 7(b) derive their origin from the glass substrate. The sulfur peak is from the PDTP, the small nickel peak is from the NiPc. The ratio of sulfur to nickel peaks suggests that the NiPc concentration is small (less that 1 atom%).

In EDAX pictures of PDTP-$ClO_4^-$, it is found that the sulfur to chlorine ratios indicate a higher chlorine content. Evidently, small amounts of phtalocyanines are needed to produce a conductivity equal to $ClO_4^-$. It is believed that the phthalocyanines increase the mobility of the charge carriers.

The following Examples are meant to be illustrative and representative only, and are not to be construed to be limiting in any way.

EXAMPLE 1

PREPARATION OF SMOOTH POLY(DITHIOPHENE) POLYMER FILM (a) To a 100 ml beaker is added 10-ml of acetonitrile to dissolve the dithiophene (0.5 g/100 ml). Next, nickel phthalocyanine tetrasulfonate (1 mM, 0.0979 g/100 ml) is added followed by water to produce a total of 50-ml of liquid. The solution turned cloudy and had the appearance of an emulsion. A cyclic voltammogram of between 0.1 and 1 volts produces a smooth texture-free film. After many cycles, there was formed a multi-colored film.

(b) Similarly, the polymerization of dithiophene is conducted as described in Example 1(a) above except that the nickel phthalocyanine tetrasulfonate is replaced with an equivalent amount of cobalt phthalocyanine tetrasulfonate. A useful smooth texture free doped poly(dithiophene) is obtained.

(c) Similarly, the polymerization of dithiophene is conducted as described in Example 1(a) above except that the nickel phthalocyanine tetrasulfonate is replaced with an equivalent amount of copper phthalocyanine tetrasulfonate.

EXAMPLE 2

ELECTROCHROMIC PROPERTIES OF PDTP FILMS

A summary of the electrochromic PDTP films is shown below in Table 2. The conditions of interest are cited as footnotes to Table 2.

TABLE 2

SUMMARY OF ELECTROCHROMIC PROPERTIES OF PDTP FILMS[a]

| Film* | Response Time (s)/ Amplitude (mV) | | | Conditions | |
|---|---|---|---|---|---|
| | 700 nm | 600 nm | 500 nm | Potential Electrolyte | (V vs. SCE) |
| NiPc-6/Pt | 4, 2.4/18 | 2.7, 7/3.2 | 3.4, 1.8/2 | 1M HCl | +0.7→−0.4 |
| NAFION ®-NiPc-7/Pt | 5, 1.9/4.2 | 3.4, 2.6/3.2 | 1.5, 2/0.5 | 1M HCl | +0.7→−0.4 |

TABLE 2-continued

SUMMARY OF ELECTROCHROMIC PROPERTIES OF PDTP FILMS[a]

| Film* | Response Time (s)/ Amplitude (mV) | | | Conditions | |
|---|---|---|---|---|---|
| | 700 nm | 600 nm | 500 nm | Electrolyte | Potential (V vs. SCE) |
| NAFION ®-NiPc-5/Pt | 1.7, 17/3.5 | 1.9, 6/6.7 | 7, 1.1/1.2 | 1M HCl | $-1.2 \rightarrow +1$ |

*Preparation conditions
[a] Constant potential of 1.2 V applied for 1 min Q(charge) = 0.01 C(coulomb) to 0.3 C in 20% $CH_3CN$/80% $H_2O$ (by volume) containing 0.01M dithiophene and 1 mM NiPc.

While the present invention has been described with reference to the specific embodiments thereof, it should be understood by those skilled in the art of conductive polymers, their fabrication, particularly poly(dithiophene) doped with a metal phthalocyanine as described herein, and their use in electrochromic displays, that various changes may be made and equivalents may be substituted without departing from the true spirit and scope of the present invention. In addition, many modifications may be made to adapt a particular situation, material, or composition of matter, process, process step or steps, or the present objective to the spirit and scope of this invention, without departing from its essential teachings.

We claim:

1. A smooth electrically conductive electrochromic polymer consisting essentially of poly(dithiophene), which polymer is doped with an electrically conductive electrochromic tetrasulfonated metal phthalocyanine, wherein the polymer-dopant combination is produced by a process which comprises:

A. contacting a solution, itself comprising:
  (a) dithiophene monomer present in between about 0.1 and 0.001M concentration;
  (b) a water-soluble salt of a tetrasulfonated metal phthalocyanine wherein the metal is selected from the group consisting of iron, copper, cobalt and nickel, and the tetrasulfonated metal phthalocyanine is present at a concentration of between about 0.01 and 10 mM; and
  (c) an electrolyte solution of acetonitrile and water in a ratio of between about 30:70 to 10:90 percent of acetonitrile to water by volume, with a cycling electrical potential of between about 0.01 volts and 10 volts and a variable current of between about 0.1 and 2 amperes,
at a temperature of between about 0° and 95° C. for between about 0.01 and 60 minutes, with a metal electrode wherein the metal electrode is selected from the group consisting of platinum, palladium, indium, gold, mixtures of these metals and indium-tin oxide (ITO) covered glass; and B. recovering the smooth electrically conductive electrochromic polymer formed thereby, wherein the electrically conductive dopant is present in between about 0.01 and 5 percent by weight.

2. A smooth electrically conductive electrochromic polymer consisting essentially of poly(dithiophene), which polymer is doped with an electrically conductive electrochromic tetra-sulfonated metal phthalocyanine, wherein the polymer-dopant combination is produced by a process which comprises:

A. contacting a solution, itself comprising:
  (a) dithiophene monomer present in between about 0.1 and 0.001M concentration;
  (b) a water-soluble salt of a tetra sulfonated metal phthalocyanine wherein the metal is selected from the group consisting of iron, copper, cobalt and nickel, and the tetrasulfonated metal phthalocyanine is present at a concentration of between about 0.01 and 10 mM; and
  (c) an electropolymerization solution of acetonitrile and water in a ratio of between about 30:70 to 10:90 percent of acetonitrile to water by volume, with a cycling electrical potential of between about 0.01 volts and 10 volts and a variable current of between about 0.1 and 2 amperes,
at a temperature of between about 0° and 95° C. for between about 0.01 and 60 minutes, with a metal electrode wherein the metal electrode is selected from the group consisting of platinum, palladium, indium, gold, mixtures of these metals and indium-tin oxide (ITO) covered glass; and B. recovering the smooth electrically conductive electrochromic polymer formed thereby, wherein the electrically conductive dopant is present in between about 0.01 and 1.0 atom percent.

3. The electrically conductive electrochromic polymer of claim 2 wherein the metal in the phthalocyanine is nickel.

4. The electrically conductive electrochromic polymer of claim 2 wherein the metal in the phthalocyanine is copper.

5. The electrically conductive electrochromic polymer of claim 2 wherein the metal in the phthalocyanine is cobalt.

6. The electrically conductive electrochromic polymer of claim 2 wherein the metal in the phthalocyanine is iron.

* * * * *